United States Patent
Scheffer

(10) Patent No.: US 7,627,847 B1
(45) Date of Patent: Dec. 1, 2009

(54) METHOD AND SYSTEM FOR REPRESENTING MANUFACTURING AND LITHOGRAPHY INFORMATION FOR IC ROUTING

(75) Inventor: Louis K. Scheffer, Campbell, CA (US)

(73) Assignee: Cadence Design Systems, Inc., San Jose, CA (US)

(*) Notice: Subject to any disclaimer, the term of this patent is extended or adjusted under 35 U.S.C. 154(b) by 282 days.

(21) Appl. No.: 11/292,800

(22) Filed: Dec. 1, 2005

(51) Int. Cl.
  *G06F 17/50* (2006.01)
(52) U.S. Cl. .............................. 716/12; 716/5; 716/19; 716/21
(58) Field of Classification Search .............. 716/1–5, 716/9–14, 19–21
  See application file for complete search history.

(56) References Cited

U.S. PATENT DOCUMENTS

| | | | |
|---|---|---|---|
| 5,729,466 A * | 3/1998 | Bamji | 716/10 |
| 6,324,674 B2 * | 11/2001 | Andreev et al. | 716/12 |
| 6,698,002 B2 * | 2/2004 | Chang et al. | 716/4 |
| 2005/0132306 A1 * | 6/2005 | Smith et al. | 716/1 |
| 2005/0273739 A1 * | 12/2005 | Tohyama | 716/4 |
| 2006/0095877 A1 * | 5/2006 | Su et al. | 716/5 |

OTHER PUBLICATIONS

Fire & Ice QXC User Guide. Product Version 3.4. Aug. 2005.
Challenges of Modeling VLSI Interconnects in the DSM ERA.
Encouter User Guide. Chapter 15: Routing Your Design With NanoRoute. May 2005.
Non-Final Office Action mailed Jun. 24, 2009 for U.S. Appl. No. 12/276,263.
Non-Final Office Action mailed Jun. 24, 2009 for U.S. Appl. No. 12/276,267.

* cited by examiner

*Primary Examiner*—Paul Dinh
(74) *Attorney, Agent, or Firm*—Vista IP Law Group, LLP

(57) ABSTRACT

A mechanism to compress manufacturing awareness into a small representation and to enable the router to consult the representation without performing, or understanding, detailed process analysis, is disclosed.

25 Claims, 5 Drawing Sheets

ALONG

|  | 50nm | 60nm | 70nm |
|---|---|---|---|
| 15nm | $4 \times 10^{-8}$ | $8 \times 10^{-9}$ | $10^{-9}$ |
| ACROSS 10nm | $5 \times 10^{-9}$ | $4 \times 10^{-9}$ | $10^{-9}$ |
| 5nm | $10^{-8}$ | $10^{-9}$ | $10^{-9}$ |

METHOD AND SYSTEM FOR REPRESENTING MANUFACTURING AND LITHOGRAPHY INFORMATION FOR IC ROUTING

BACKGROUND

With the advent of deep sub-wavelength lithography, the relationship between width, spacing, and yield is more complex than it used to be. The conventional solution is obtained by running optical and etching simulation software to find the process window, and then simulating process variations to find the expected yield. This may be acceptable for defining process characteristics, but far too slow for a router that must make millions of width and spacing decisions to complete a single design.

In order to fabricate successfully, all lines and all spaces must print correctly. The spaces must print correctly, or else a short may occur. The lines must print correctly or an open may occur. Failure of the chip fabrication can occur for varied reasons. Three of the reasons are discussed below. First, the dose or focus might be off enough so that the line or space does not print properly. This may be referred to as an 'optical' problem, or a lithography problem. Second, a stray particle can land on the mask or wafer, perhaps breaking a line or causing a short. This can be referred to as a 'particle' problem. Third, a via can fail to work correctly, due to variety of reasons. This may be referred to as a 'via' problem. These challenges are described in more detail in the following paragraphs.

The particle problem is well understood. Particle size distribution can be measured for a given set of fabrication constraints. For example, FIG. 1 is a representation of a particle size distribution graph to determine the number of particles of a particular size that may be available to cause a failure. The graph shows that as the particle size decreases the number of particles in a square centimeter increases. Thus the odds of failure are reduced if the width or spacing is greater than the smaller particle sizes. However, in the absence of detailed data some particle size distribution can be assumed ($1/x^3$ is typical).

A 'critical area' can be measured for any size particle—this critical area is the area of the portion of the layout where the chip would malfunction if the center of a particle of the specified size landed in this area. The particle size distribution and critical area determine the yield from this effect. In general, the details of this model have not mattered much to routers since the curve is so steep that the solution to date has been to evenly distribute any remaining space.

The optical, or lithography, problem in which the dose (i.e., exposure) and focus may be skewed, is where the recent complexities occur. Here a bigger spacing is not always better, and may be considerably worse. In fact some dimensions, even though larger than the minimum, may not be permitted at all. These "not-permitted" dimensions may be referred to as "forbidden pitches," and result from the sophisticated optical tricks needed to print these sizes at all. For example, lithography may be optimized to print the narrowest lines and spaces. Larger spaces will then work less well, until the spacing is large enough to allow assist features (may be referred as scattering bars) to be inserted. In some cases the process window at the intermediate spacing is so small there is virtually no chance of both the space and the lines printing correctly, this is a forbidden pitch.

One prior solution is referred to as 'design rules'. These rules may be very simple and binary in nature. Any solution that meets the rules is acceptable (and all solutions are equally acceptable), and any solutions that does not meet the rules is forbidden (and all such solutions are equally forbidden). The rules are simple, consisting of, at most, a list of spacings according to wire width, and often just a single minimum width and spacing. For example, a common routing design rule is to route a wire no closer to an object than some specified minimum spacing (typically roughly equal to the width of the wire) so that they will have enough space to function properly.

Another prior solution is referred to as 'scripts'. Scripts are command sequences that tell the router what to do. For example, the scripts may instruct the router to first double all vias wherever there is enough space, and then route the remaining wires. These scripts are intended by the user to result in designs with increased yield. However, this is not always the case.

The drawback to both previous solutions is that they do not describe the real manufacturing system very well. In practice, different spacings and widths have different degrees of manufacturability. Second, because of the binary nature of the rules, there is no guidance once the rules are met. That is, each scenario that meets rules is treated equal to the other scenarios that meet the rules, when that may not be the case. Exact minimum spacing, twice this spacing, and so on, are all exactly as good to the router. So the router has no reason to pick one configuration over another.

Some more specific example problems include:

Existing routers cannot include considerations of lithography, particle yield, and via problems simultaneously.

Existing routers cannot make an intelligent choice among many alternatives, since all are exactly equal under the older concept of design rules.

Existing routers cannot obey the idea of 'forbidden pitch', where certain spacings are not permitted even though a smaller spacing is acceptable or fits within the design rules.

Existing routers cannot make an intelligent tradeoff between extra vias and increased critical area, so it must follow simple strategies such as doubling all vias, then increasing spacing, even though this may not be optimum and in fact hurt the overall yield. For example, FIG. 2 illustrates single, double and triple vias. Single via 212 is surrounded by metal 210. Double vias 222 and 224 is surrounded by metal 220 and triple vias 232, 234, 236 are surrounded by metal 230. Adjacent to the via objects is object 240. When a via is doubled or tripled the probability of the via working increases, however, the critical area between the via(s) and the adjacent object increases as well. That is, as the via yield is increased, the line printing yield may decrease or the critical area may be large enough for a particle failure. For example, single via 212 has a critical area 218. However critical area 228 associated with double vias 222 and 224 is larger than critical area 218, and thus the line printing may have a lower yield due to particle problems than single via 218. Similarly, critical area 238 associated with triple vias 232, 234, and 236 is larger still and may have a lower yield than a double via or single via.

Existing routers cannot maximize yield, which is what the user really wants. Instead it simply tries to minimize area, which may or may not lead to the maximum yield design. In particular, existing routers may never consider non-minimum sized designs, even though they may have enough increased yield to more than compensate for their larger size.

Existing router and extractor estimates of parasitics and critical areas do not take into account how the real manufactured silicon will look since it is too time consuming to do so, even though this information can be calculated.

SUMMARY

A mechanism to compress manufacturing awareness into a small representation and to enable the router to consult the representation without performing, or understanding, detailed process analysis, is disclosed. A mechanism to compress manufacturing awareness into a router aware representation includes obtaining the fabrication constraints, obtaining the space and wire data, obtaining the particle data, obtaining the via data, and storing the data into tables for the router to access.

A method for routing an IC may include extracting a first set of information, extracting a second set of information, and creating routing alternatives based on the first set and second set of information.

A system for IC routing may include a set of particle information tables, a set of via information tables, and a routing engine.

A method for compressing manufacturing awareness into a router representation for integrated circuit routing includes obtaining a set of fabrication parameters, obtaining particle data, obtaining via data, normalizing the particle and via data, and storing the data in tables for the router to access while making routing decisions.

DETAILED DESCRIPTION

A way to compress manufacturing awareness into a small representation that the router may consult without the need to perform (or understand) detailed process analysis is discussed and includes a way for routers and extractors to take lithographic constraints into account during their estimates of parasitics.

In one embodiment, three sets of tables provide this awareness. One set of tables describes the problem of printing spaces and lines, a second set of tables details the problems of particles, and the third set of tables details the problems of vias. The first set of tables tell the router the likelihood of optical problems. In the explanation below, vertical lines are used, but other lines may be used as well. Also in this example, parallel lines dominate the yield for machine routed data.

The first set of tables may include two tables. A first table includes line printing information. A second table includes space printing information. The optical line printing table, in some embodiments, may be indexed by space width, wire width, space width, wire width, space width (space-width-space-width-space, or SWSWS). The optical space printing table, in some embodiments, may be indexed by wire width, space width, wire width, space width, and wire width. (width-space-width-space-width, or WSWSW). In some embodiment, each width and spacing may assume 10 values, that is 100,000 entries for each of the two tables. This structure may be referred as a five-dimensional table with each width considered a dimension. In other embodiments, a three-dimensional table structure may be implemented with an indexing of SWS and WSW with fewer entries per table.

Figure 3A:
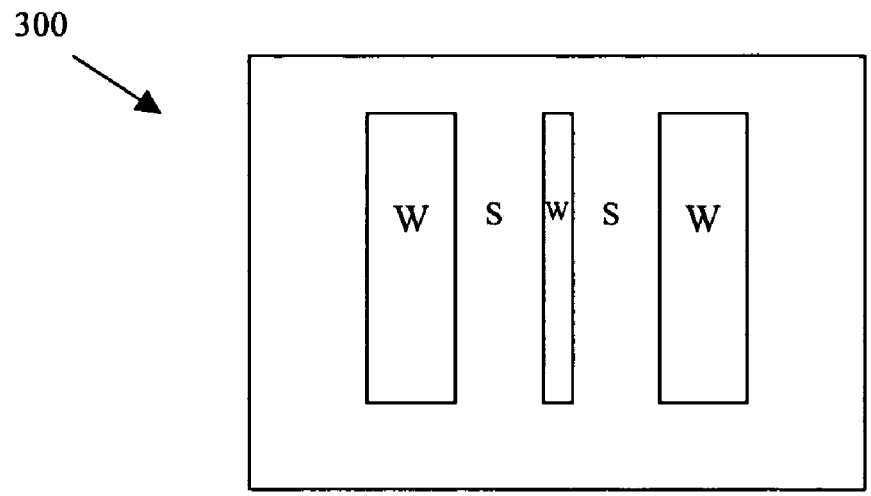
FIG. 3A represents an example design used to generate wire table data.
Figure 3B:
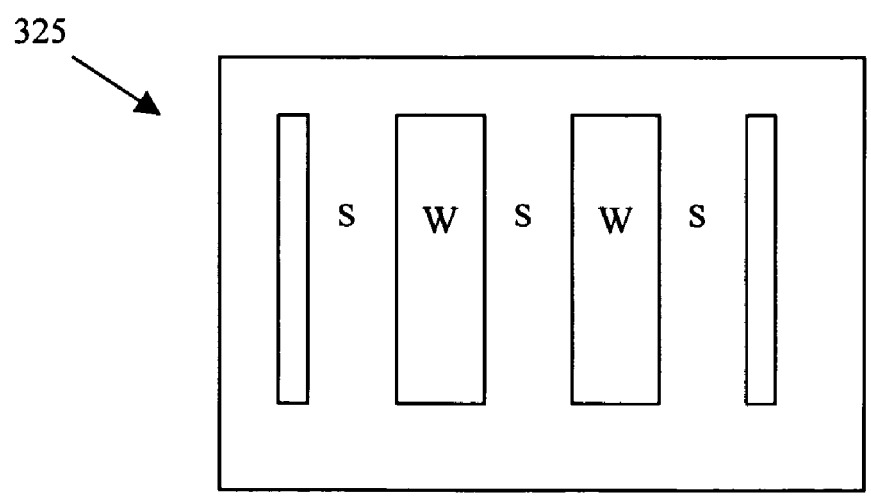
FIG. 3B represents an example design used to generate space table data.
Figure 3C:
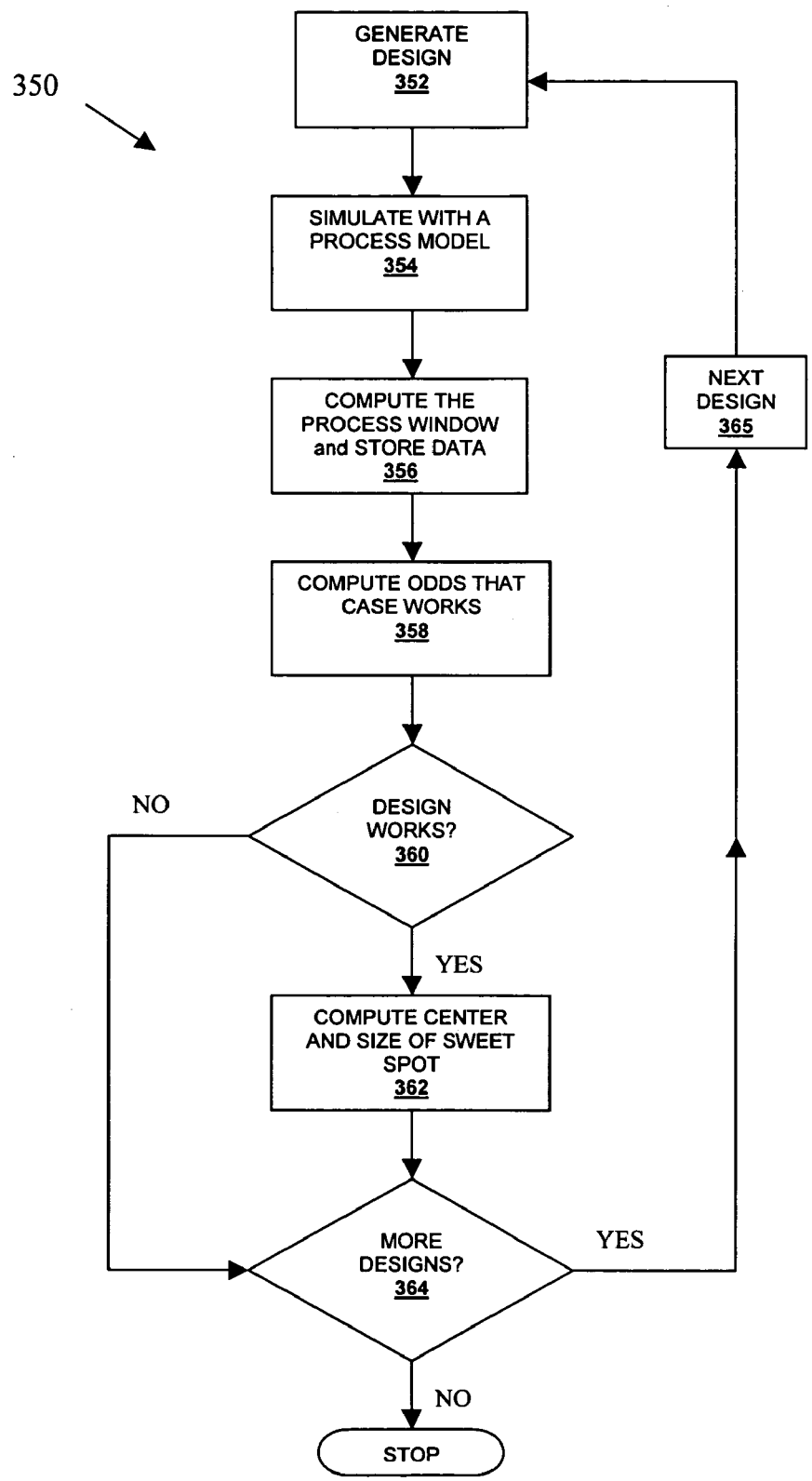
FIG. 3C represents a flow diagram that illustrates the derivation process for lithography table information.

The wire and space printing information may be obtained by process 350 in FIG. 3C. In process action 352 a design is created. An example wire printing design 300 is shown in FIG. 3A. An example space printing design in shown in FIG. 3B. In process action 354, the design is simulated with a process model using the fabrication parameter. Process action 356 computes the process window and stores it in the table in terms of focus and dose. Process 358 computes the odds that the particular design works using more detailed (but time consuming) methods such as optical simulation and Monte Carlo analysis. Process action 360 determines if the design will work. If the design works, process action 362 computes the center and size of the sweet spot. In some embodiments, this information may be stored in an application data table for use by the router, other embodiments do not use this information at all. If the design does not work, or after the center and sweet spot are computed, process action 364 determines if there are more designs to test. If there are more designs to test, process action 365 selects the next design and returns process 350 to process action 352. If there are no more designs to test, process 350 stops.

The plurality of designs may be created by altering the widths of each of the spaces and wires in the example designs, such as those shown in FIGS. 3A and 3B. The quantity of designs tested may vary. It may take more time to design and test more examples but the reward is more accurate data for the router. Some embodiments may require more accurate data and may utilize 10 values for each of the width dimensions creating 100,000 designs for wire data and 100,000 designs for spacing data, whereas some embodiments may require faster results and utilize fewer dimensions or fewer values for each dimension creating fewer designs.

A more quantitative generalization of forbidden pitch can be represented in the wire and space tables. A completely forbidden pitch can be represented in this format as a zero-sized process window. Also, the bad pitches can depend on the width of the wires on either side, as is desired.

Some embodiments may use application information associated with the line and space printing tables. This information may include, for example, the center of the sweet spot of the process window in terms of focus and dose as calculated in process action 362 in FIG. 3C, and the expected displacement of the edge (as manufactured) from where it was drawn. Uses of this application information are explained later.

The second set of tables details the problems of particles and critical area calculations. In this set there may be two tables. A first table may describe the probability of a particle causing an undesirable open circuit. A second table may describe the probability of a particle causing a short circuit. The information in the tables indicates the number of particles per square centimeter that are likely to be available in a clean room that could cause a failure per a certain size of critical area. That is, critical area is based on the distribution of particle sizes and the probability of the particle landing on the space.

Figure 1:
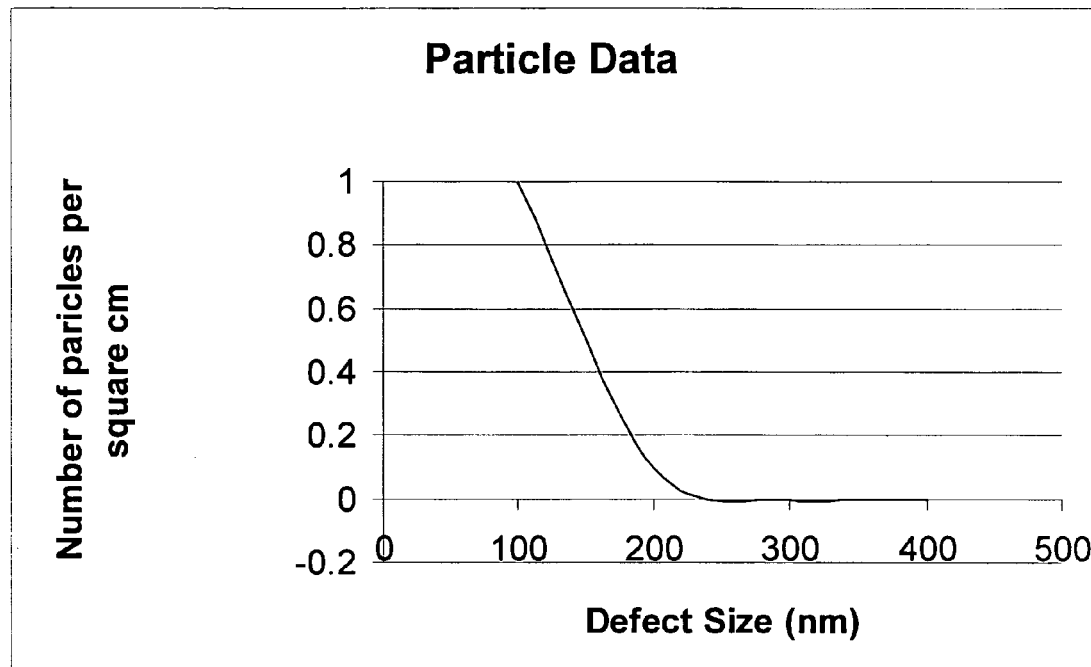
FIG. 1 represents an example particle data chart.
Figure 2:
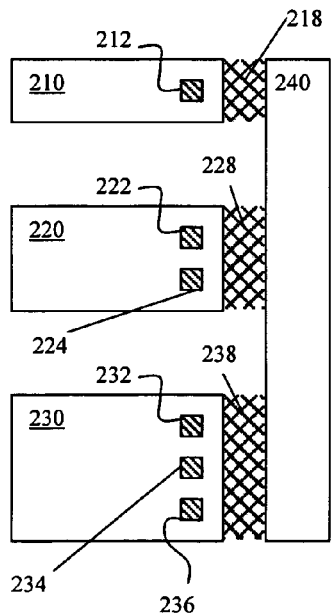
FIG. 2 represents example single, double and triple vias.

The critical area is computed between every piece of neighboring material. For illustration, FIG. 2 shows the computation for the metal associated with via(s), but in fact all materials are considered. For example, critical area 218 in FIG. 2 has a certain probability of failure due to open circuits and a certain probability of failure due to short circuits. Critical areas 228 and 238 in FIG. 2 have higher probability of failure than critical area 218 because there is a longer space that has to be concerned about a landing particle.

Figures 4, 5:
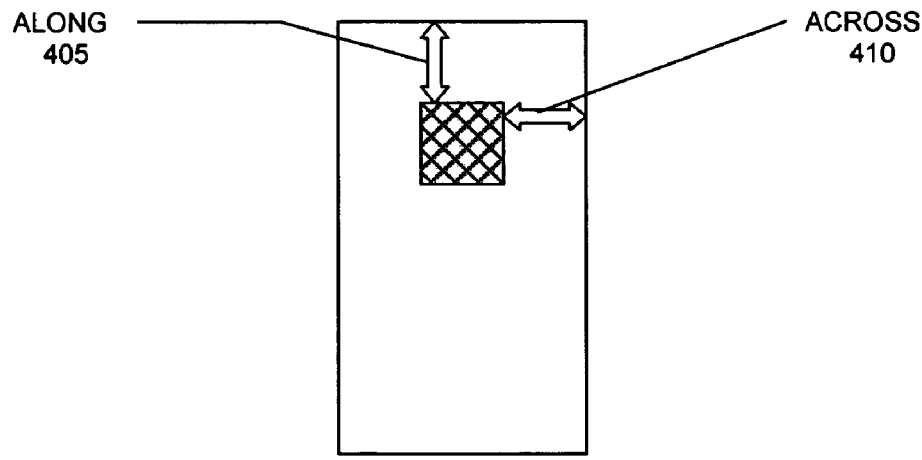
FIG. 4 represents example across and along measurements.
FIG. 5 represents example via data.

The third set of tables reflects the overlap of cuts and the odds that a via instance fails. An expression to represent this relationship may be rel=ƒ(number of cuts, overlaps). That is, the critical area failure probability is a function of both the number of cuts, or number of vias, and the metal overlap of the vias. The number of vias may be single, double, triple or even more. Overlap of vias involves the width of the metal surrounding the set of vias. The width of metal surrounding the via may be referred to as the across and the along. An example of these measurements is shown in FIG. 4. Along 405 is the measurement from the end of the via to the short side of the metal. Across 410 is the measurement from the end of the via to the long side of the metal. The width of these two measurements impacts the probability of failure due to misalignment, overetching, and other possible fabrication problems. This data is layer dependent. That is, each layer may have differing characteristics such as thickness or material, and thus each layer may have a differing contribution to failure probabilities. Consequently, each layer has its own via data. Further, there may be a single, double, triple, or more vias in each layer, and since that via may be cutting through to the layer above or to the layer below there may be two set of information per via. In some embodiments, there may be six tables of data for each layer—a table for odds of a failure of a single via to the layer below, a table for odds of a failure of a single via to the layer above, a table for odds of failure of a double via for the layer below, a table for odds of failure of a double via to the layer above, a table for odds of failure of a triple via to the layer below, and a table for odds of failure of a triple via to the layer above. In one embodiment, the triple, quadruple (or more) vias are all assumed to fail at the triple via rate, since due to all the redundancy, all such vias are very reliable, and distinguishing between them will not significantly impact the results. Example via data is shown in FIG. 5. The chart shows across width versus the along width. Each grid space details the odds that a particular across value and a particular along value pair will have a failure. In some embodiments, there may be only one number in the grid, that is, each grid position is assumed to have the same odds of failure.

Figure 6A:
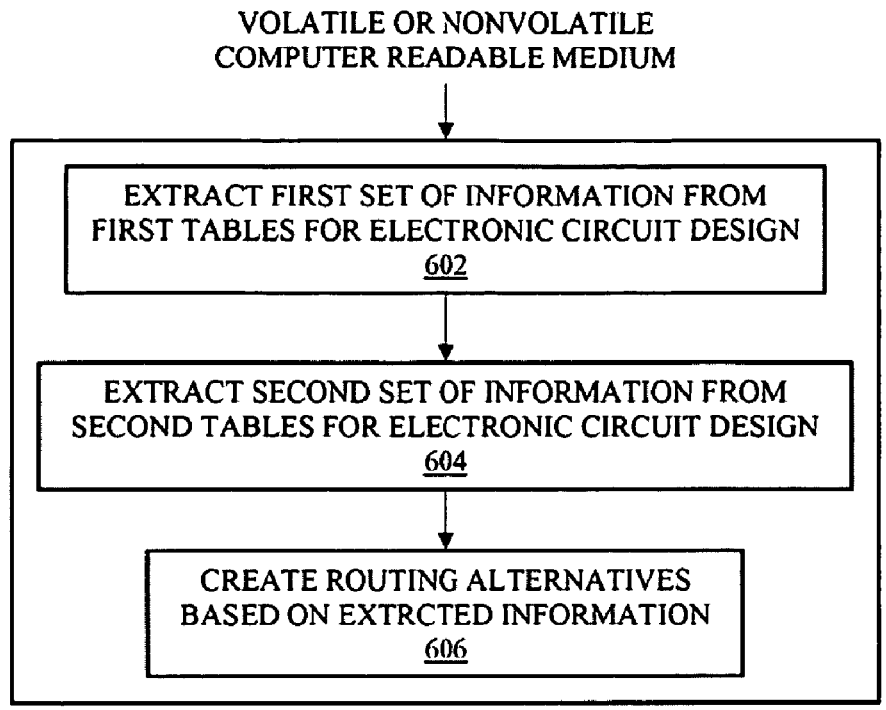
FIG. 6A represents a flow diagram that illustrates an embodiment of the router contemporaneously considering sets of information.

Each of the tables may be calculated in similar units so they can easily be combined into a total manufacturing yield analysis, including each type of failures as appropriate. In some embodiments, the estimates are realistic failure rates, that are close to actual fabrication figures. In this case, cost may be calculated as cost=−log(failure rate), and then a real yield can be estimated. However, this is not necessary, since in general the router is comparing configurations. In an embodiment where the estimates are not realistic failure rates, the entries may be treated as costs, and only their relative magnitude is significant. Using cost values simplifies calculations for the router because the router is already accustomed to evaluating costs of fabrication. Thus, translating the failure rates into costs places the data into terms the router understands and can manipulate. FIG. 6A is an illustration of an example router process 600. In process action 602 the router extracts a first set of information from the tables. In process action 604 the router extracts a second set of information from the tables. In some embodiments, the first set and second set of information can include any two of particle information, via information, and lithography information. In other embodiments, three sets of information may be used taking into consideration particle, via, and lithography information contemporaneously in routing decisions. In process action 606 the router creates alternative routings based on the two sets of information. In some embodiments the designer weighs the pros and cons of each alternative routing and chooses the most suitable one for his needs. In some other embodiments the router may be programmed to select the most suitable routing.

Figure 6B:
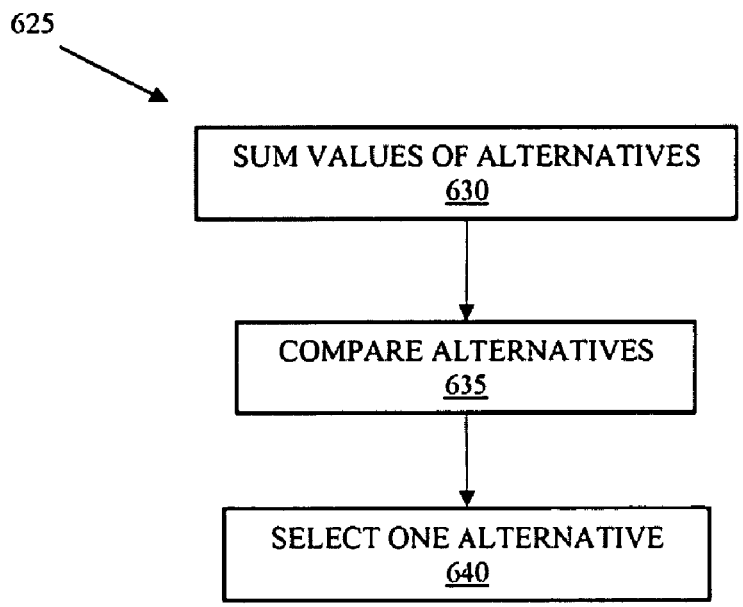
FIG. 6B represents a flow diagram that illustrates an embodiment of the router comparing alternative routings.

With this information, the router can make intelligent choices in using extra space for extra width, for extra spacing, or for a combination. It can also choose intelligently between an extra via and wider spacing. For example, the router may have some extra room and needs to decide how to use it. The goal is to have the vias, the spaces, and the wire widths work. For example, let the total amount of room available be R. Then the router can select spaces and wire widths (e.g., S1, W2 and S2) such that S1+W2+S2=R, where S1=−log(failure rate of S1), S2=−log(failure rate of S2) and W2=−log(failure rate of W2). Process 625 shown in FIG. 6B illustrates the embodiment of the router selecting between alternatives. In process action 630, the router calculates the table values of the alternatives. In some embodiments the table values are the odds of failure or failure rate. In other embodiments the table values are "costs" calculated by taking the −log of the failure rate. In some embodiments the costs can be weighted. In process action 635 the alternatives are compared. In process action 640 the router selects one of the alternatives. In some embodiments, the router may choose an alternative based on yield alone. In some embodiments, the router may choose an alternative based on yield and cost or based on yield, cost and timing.

In a similar way, the router can now decide in an intelligent way about the relative merits of the two configurations. The two spaces (S1, S2) must print, the wire (W2) must print, and at least one of the two vias (the original and the extra via) must work. The calculation is slightly more complex since the length of wire at the various spacings changes as well, but it still boils down to minimizing the (weighted) sum of various failure probabilities. In particular, note that if putting the wire in the center results in two forbidden pitches, then the router may move the wire to one side or the other.

The following example is an embodiment of when the router can use the application information from the tables. In a real chip, the spaces and the wire share a single random focus and dose since they are very close together. Theoretically it is possible for the first space to print correctly 50% of the time, and the second space to print correctly 50% of the time, but for there to be no conditions under which they both print correctly, so the yield is 0 rather than 50%. Once the process regions are obtained, they can be checked for this scenario. Using the application table entries of center of the sweet spot and size of the sweet spot for both spaces and the lines, the router can look at the overlap to check for compatibility.

Another application entry is a field containing 'edge displacements as printed on the silicon' entry. The router and/or extractor may use this to modify the electrical equivalent widths of the wires and then compute an 'optically correct extraction' for very little additional cost. It may also lead to a much more accurate critical area calculation. In some embodiments a line/space based model may be used, where each edge displacement can be computed twice, since each edge is one edge of a space and one edge of a line. In some embodiments a program can use the average of the two computed displacements. In other embodiments, the derivatives of the edge placement may be listed with changes.

In some embodiments, the lithographic tables can be restated in terms of lithographic effects on edges, rather than on lines or spaces. This would require fewer tables, but the complexity of the calculation of the odds that a given line or space prints correctly would increase, since each line or space has two edges.

In some embodiments, extra tables may be included for use in special circumstances (such as local density or orientation). These tables can be used to make adjustments for particular circumstances.

In some embodiments, the data can also be developed using functions, rather than tabulated values if a set of suitable functions can be found. Alternatively, the tables could contain the joint probability of success, at least for a wire and adjoining spaces, instead of specifying a process window and having the router compute this. Also, various other formats can be used to express this idea.

In some embodiments, when computing the odds of failure, the idea that printing 'fails' can be determined in many ways. For example, printing failure could be when the line becomes and open (or the space actually shorts), or could be when the line or space goes out of geometrical tolerance, or some other criteria.

In some embodiments, instead of, or in addition to process windows, the tables could contain the nominal result and sensitivities with respect to the relevant variables, such as dose and focus. For example, a process window might state that the wire width will be acceptable provided the dose is between 18 and 22 mJ/cm$^2$. The sensitivity based version might say that the resulting wire width=100 nm+10 nm cm$^2$/mJ*(dose−20 mJ/cm$^2$) between. Then the user (or program) can compute the range of acceptable doses based on their knowledge of the acceptable width for the wire.

The method allows the router to include considerations of both lithography and particle yield problems, provides enough information so the router can intelligently select among alternatives, and allows the expression of 'forbidden pitch', where a particular pitch is not allowed even though a smaller pitch is OK.

The method further allows the router to make an intelligent tradeoff between extra vias and increased critical area. The goal of the router is to maximize yield, a truer indication of what the user wants, rather than just minimizing area. This may potentially result in non-minimum sized designs not currently considered by existing routers.

The extraction of parasitics and critical areas to take into account how the real manufactured silicon will look, at least to first order, without the need to do time consuming simulations, can be performed with this method, with use of tables to convey essential lithographic information to a router. This allows a router to use probability of correct construction, rather than minimum width and spacing.

Therefore, the router makes decisions with a goal of maximize yield, taking into consideration any two or three of lithography, particle, and via constraints simultaneously. The router also has the ability to trade off among the yield losses induced by via failure, lithography failure, and particle failure.

What is claimed is:

1. A method of routing an electronic circuit design of an electronic circuit, the method comprising:
   extracting, by using a router or an extractor, a first set of information for the electronic circuit design from a first set of data structures, wherein the first set of information is to be used by the router for routing the electronic circuit design;
   extracting, by using the router or the extractor, a second set of information for the electronic circuit design from a second set of data structures, wherein the second set of information is to be used by the router for routing the electronic circuit design, wherein
      the first set of information comprises particle information, and the second set of information is selected from a group comprising via information and lithography information;
   displaying the first set of information or the second set of information on a display apparatus or storing the first set of information or the second set of information on a storage device or a tangible computer readable medium; and
   creating, by using a processor, a first routing of the electronic circuit design based on the first and second sets of information.

2. The method of claim 1, further comprising:
   creating a second routing of the electronic circuit design based on the contemporaneous consideration of the first set of information and the second set of information;
   comparing the first routing and the second routing of the electronic circuit design to determine whether the first routing or the second routing performs better; and
   selecting one of the first routing or the second routing based on the comparison.

3. The method of claim 2, wherein comparing the first and second routing comprises:
   summing a first probability of failure data associated with the first routing;
   summing a second probability of failure data associated with the second routing; and
   comparing the sums.

4. The method of claim 2, wherein comparing the first and second routing comprises:
   summing first cost data associated with first routing;
   summing second cost data associated with the second routing; and
   comparing the sums.

5. The method of claim 1, wherein the act of creating the first routing is performed without a need for performing analysis of or simulating a fabrication process model.

6. The method of claim 2, wherein the comparison is based on yield or cost.

7. The method of claim 1, wherein the first set of information or the second set of information comprises a joint probability of success of at least two of the particle information, the via information, and the lithography information for fabricating a circuit feature of the electronic circuit.

8. The method of claim 1, wherein the particle information includes information regarding particles that are identified, during manufacturing of the electronic circuit, at one or more locations so as to cause an open circuit or a short circuit.

9. The method of claim 1, wherein the via information includes information regarding single vias, double vias, and triple vias to and from each layer.

10. The method of claim 1, wherein the first routing comprises an initial routing of the electronic circuit design.

11. The method of claim 10, wherein creating the first and second routings includes making trade-offs between increasing vias and increasing critical area.

12. The method of claim 10, wherein the act of creating the first routing by the router comprises optimizing yield of fabrication of the electronic circuit.

13. The method of claim 7, wherein the lithography information includes forbidden pitch, forbidden pitch being an instance in which chances of both a set of lines and a set of spaces printing properly approximates zero even though the set of spaces is larger than a minimum space value.

14. The method of claim 7, wherein the lithography information includes information regarding a plurality of wire printing scenarios and information regarding a plurality of space printing scenarios.

15. The method of claim 1, wherein the first and second set of tables comprise probability of failure information.

16. The method of claim 1, wherein the first and, second set of tables comprise cost information.

17. The method of claim 1, further comprising:
extracting a third set of information; and
creating the first routing based on the first, second, and the third sets of information.

18. A system for routing an electronic circuit design, the system comprising:
means for extracting, by using a router or an extractor, a first set of information for the electronic circuit design from a first set of data structures, wherein the first set of information is to be used by the router for routing the electronic circuit design;
means for extracting, by using the router or the extractor, a second set of information for the electronic circuit design from a second set of data structures, wherein the second set of information is to be used by the router for routing the electronic circuit design, wherein
the first set of information comprises particle information, and the second set of information is selected from a group comprising via information and lithography information;
means for creating a first routing of the electronic circuit design based on the first and second sets of information, wherein the means for creating comprises a processor; and
a display apparatus configured for displaying the first set of information or a second set of information or a storage device or a tangible computer readable medium configured for storing the first set of information or the second set of information.

19. The system of claim 18, further comprising:
means for creating a second routing of the electronic circuit design based on the contemporaneous consideration of the first set of information and the second set of information;
means for comparing the first routing and the second routing of the electronic circuit design to determine whether the first routing or the second routing performs better; and
means for selecting one of the first routing or the second routing based on the comparison.

20. The system of claim 19, wherein the means for comparing the first and second routing comprises:
means for summing a first probability of failure data associated with the first routing;
means for summing a second probability of failure data associated with the second routing; and
means for comparing the sums.

21. The system of claim 19, wherein the means for comparing the first and second routing comprises:

means for summing first cost data associated with first routing;
means for summing second cost data associated with the second routing; and
means for comparing the sums.

22. A computer program product that includes a computer-readable volatile or non-volatile medium having a sequence of instructions which, when executed by a processor, causes the processor to execute a process for routing an electronic circuit design, comprising:
extracting, by using a router or an extractor, a first set of information for the electronic circuit design from a first set of data structures, wherein the first set of information is to be used by the router for routing the electronic circuit design;
extracting, by using the router or the extractor, a second set of information for the electronic circuit design from a second set of data structures, wherein the second set of information is to be used by the router for optimizing the yield of the fabrication of the electronic circuit design, wherein
the first set of information comprises particle information, and the second set of information is selected from a group comprising via information and lithography information;
displaying the first set of information or the second set of information on a display apparatus or storing the first set of information or the second set of information on a storage device or a tangible computer readable medium; and
creating, by using a processor, a first routing of the electronic circuit design based on the first and second sets of information.

23. The computer program product of claim 22, further comprising:
creating a second routing of the electronic circuit design based on the contemporaneous consideration of the first set of information and the second set of information;
comparing the first routing and the second routing of the electronic circuit design to determine whether the first routing or the second routing performs better; and
selecting one of the first routing or the second routing based on the comparison.

24. The computer program product of claim 23, wherein comparing the first and second routing comprises:
summing a first probability of failure data associated with the first routing;
summing a second probability of failure data associated with the second routing; and
comparing the sums.

25. The computer program product of claim 23, wherein comparing the first and second routing comprises:
summing first cost data associated with first routing;
summing second cost data associated with the second routing; and
comparing the sums.

* * * * *

UNITED STATES PATENT AND TRADEMARK OFFICE
CERTIFICATE OF CORRECTION

PATENT NO. : 7,627,847 B1  Page 1 of 1
APPLICATION NO. : 11/292800
DATED : December 1, 2009
INVENTOR(S) : Louis K. Scheffer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 394 days.

Signed and Sealed this

Twenty-first Day of December, 2010

David J. Kappos
*Director of the United States Patent and Trademark Office*